Feb. 19, 1935.　　　　J. R. HOLMES　　　　1,991,555
OIL TEMPERATURE REGULATOR
Filed Oct. 31, 1932　　5 Sheets-Sheet 2

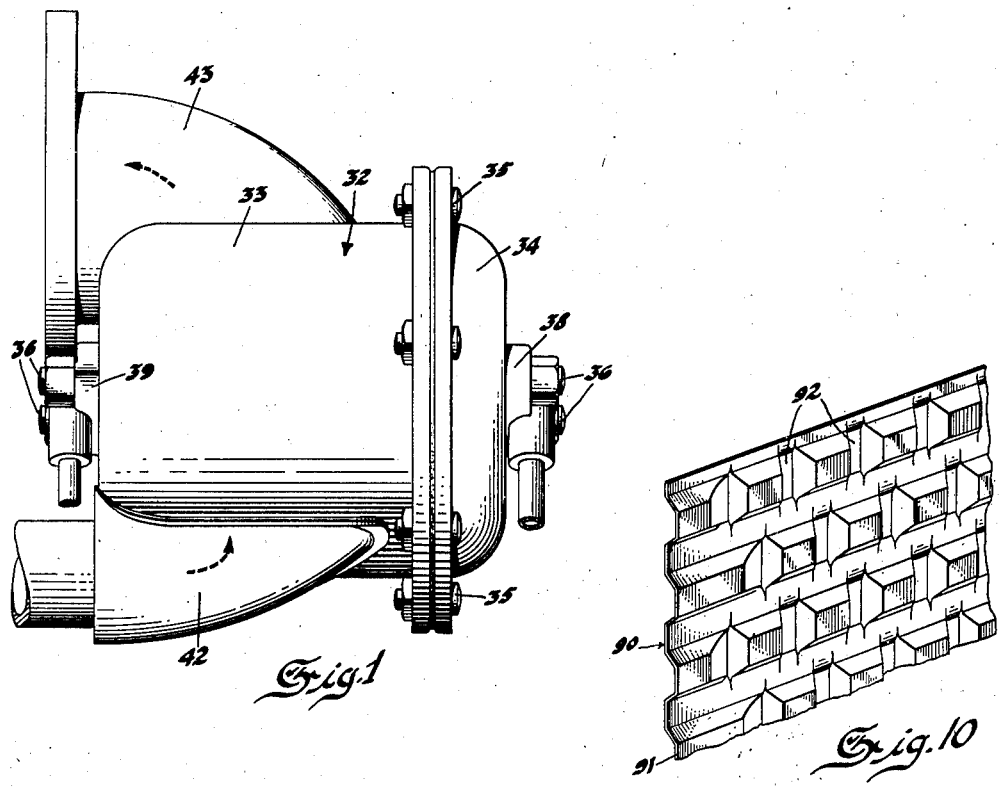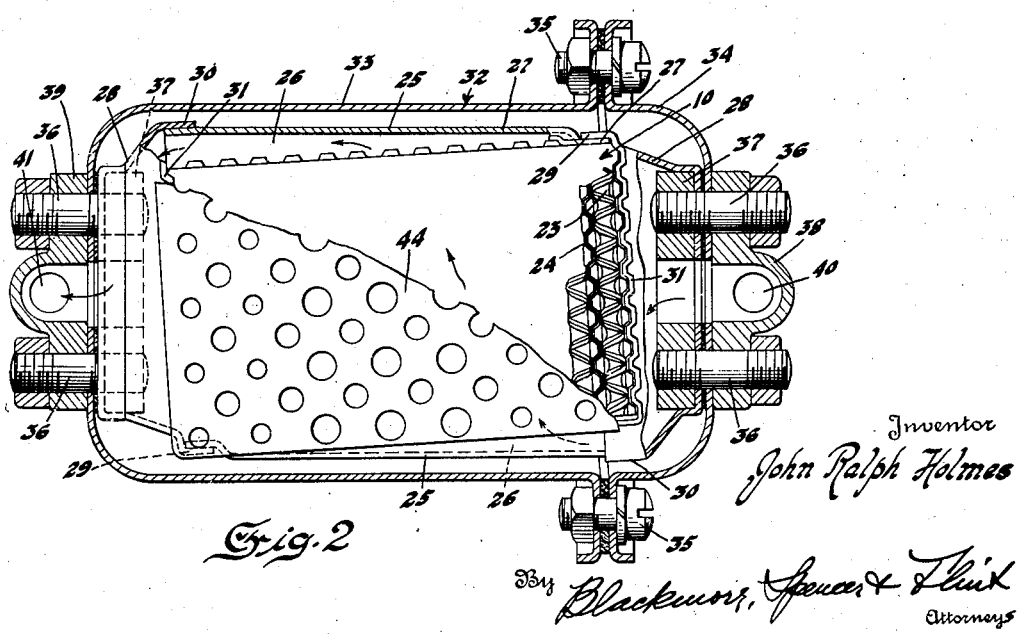

Inventor
John Ralph Holmes
By Blackmore, Spencer & Fluit
Attorneys

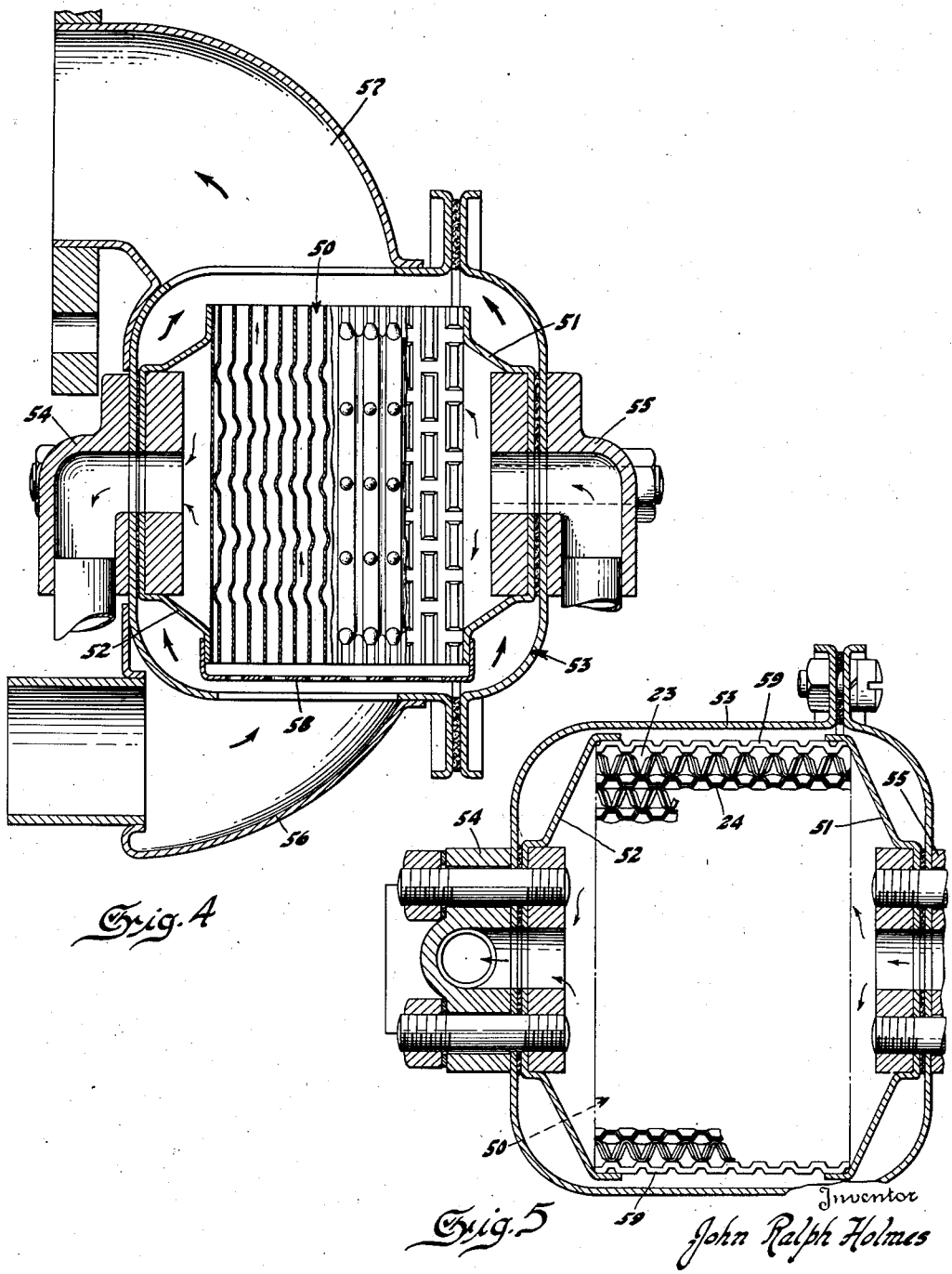

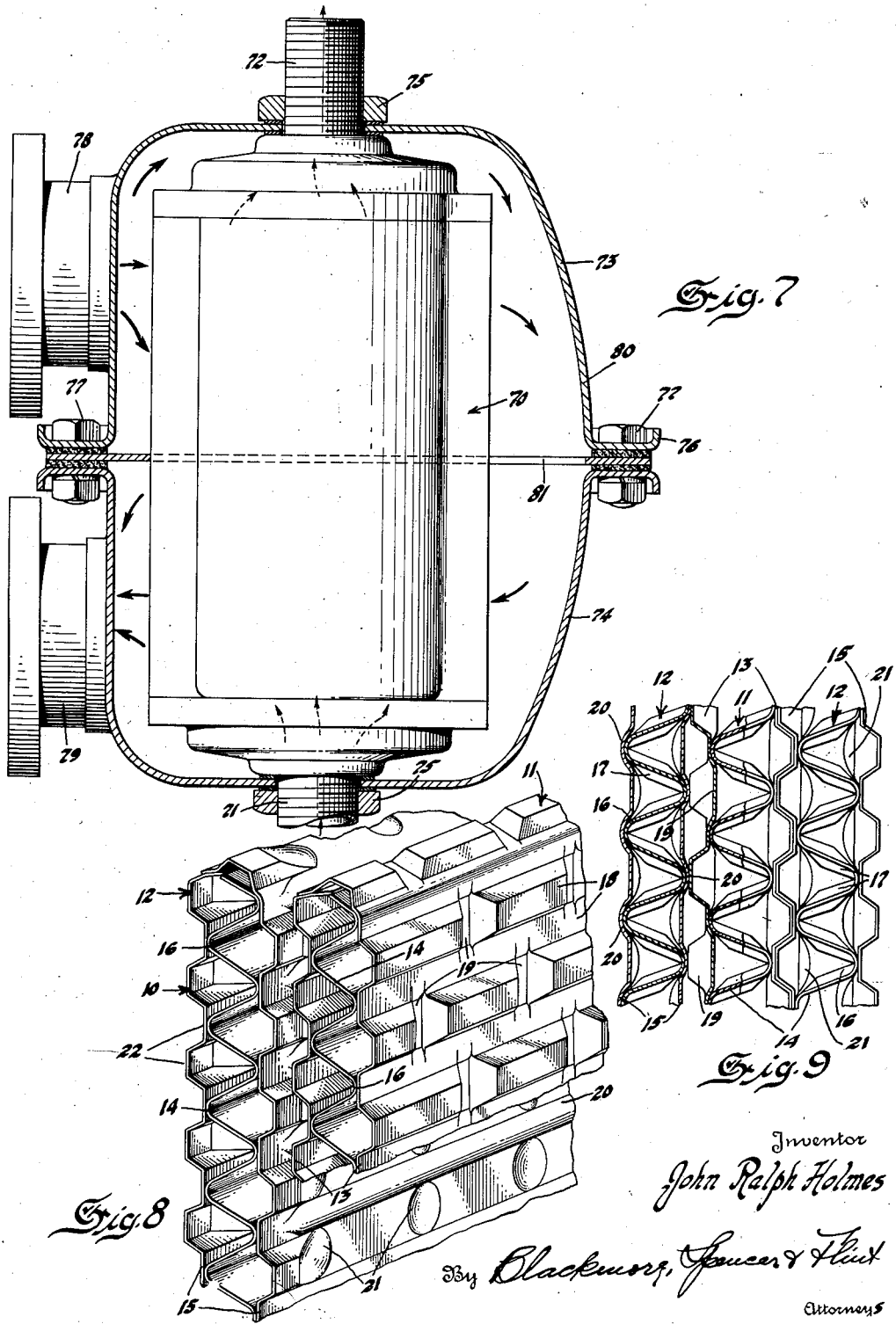

Patented Feb. 19, 1935

1,991,555

UNITED STATES PATENT OFFICE 1,991,555

OIL TEMPERATURE REGULATOR

John Ralph Holmes, Lockport, N. Y., assignor, by mesne assignments, to General Motors Corporation, Detroit, Mich., a corporation of Delaware Application October 31, 1932, Serial No. 640,365

15 Claims. (Cl. 257—245)

The inability of heat exchanger cores of the multi-cellular type to withstand the pressures obtaining in the lubricating systems of internal combustion engines has heretofore precluded the use of heat exchangers of the multi-cellular core type in regulating the temperature of the lubricant in internal combustion engines. This invention relates to heat exchangers of the multi-cellular core type and resides, principally, in a heat exchanger of the multi-cellular core type which is so constructed and/or arranged that the core is capable of withstanding the pressures obtaining in the lubricating systems of internal combustion engines.

For a better understanding of the nature and objects of the present invention, reference is made to the following specification in which are described the preferred embodiments of my invention which are illustrated in the accompanying drawings.

In the accompanying drawings:

Figure 1 is a side elevation of an oil temperature regulator in which my invention is embodied.

Figure 2 is a longitudinal section through the oil temperature regulator shown in Figure 1.

Figure 4 is a longitudinal section through a second oil temperature regulator in which my invention is embodied.

Figure 5 is a longitudinal section, at a right angle to that shown in Figure 4, through the oil temperature regulator shown in Figure 4.

Figure 7 is a longitudinal section through a fourth oil temperature regulator in which my invention is embodied.

Figure 8 is an enlarged fragmentary perspective view of core units from which the cores of the oil temperature regulators shown in the preceding figures are made.

Figure 9 is an enlarged fragmentary view, partly in elevation and partly in section, through a core of the type shown in the preceding figures.

Figure 10 is an enlarged fragmentary perspective view of an element of a modified form of core unit.

Figure 3:
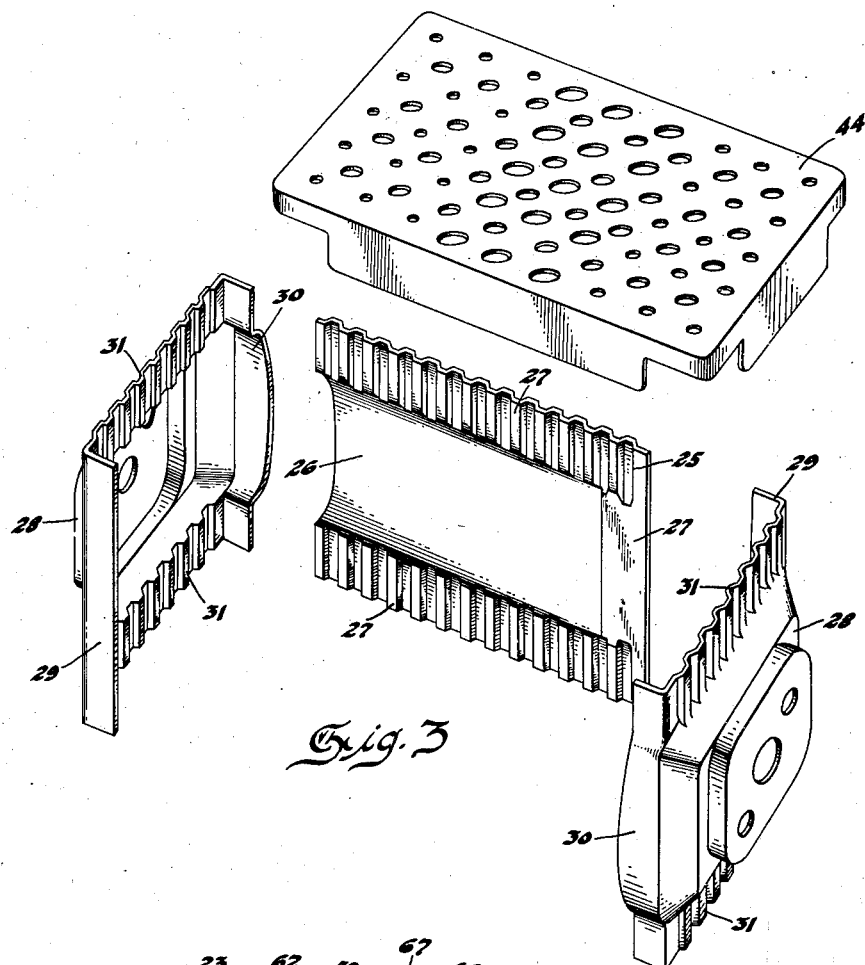
Figure 3 is an exploded view of interior parts of the oil temperature regulator shown in Figures 1 and 2.

In the oil temperature regulator shown in Figures 1, 2 and 3, there is included a core 10 which, as is shown best in Figures 8 and 9 of the drawings, consists of a plurality of units 11 and 12. Each of the units 11 may be considered to consist of two plates 13 and a separator 14, and each of the units 12 may be considered to consist of two plates 15 and a separator 14.

Each of the separators 14 consists of a thin sheet of copper or other suitable metal in which, throughout its length, there are formed deep parallel corrugations 16 of uniform size and shape which extend from one side edge to the other of the separator. In the side walls of each corrugation, there are formed a series of alternately outwardly and inwardly disposed depressions 17 which are so arranged that each outwardly disposed depression in one wall of each corrugation is in alignment transversely of the corrugations with an inwardly disposed depression in the other wall of the corrugation, and that each inwardly disposed depression in one wall of a corrugation is in alignment transversely of the corrugations with an outwardly disposed depression in the other wall of the corrugation.

Each of the plates 13 consists of a thin sheet of copper or other suitable metal in which, throughout its length, there are formed parallel corrugations 18 which extend from one side edge to the other of the plate. The corrugations 18 are of uniform size and shape and their inter-center spacing is equal to that of the corrugations 16 in the separators 14. Each of the corrugations 18, on what may be considered the outer side of the plate, is joined to the next adjacent corrugation on one side by a series of depressions 19 which are equal in width to and of greater depth than the corrugations which they join and to the next adjacent corrugation on the other side by a series of similar depressions 19 which are staggered with respect to the first mentioned series of depressions.

Each of the plates 15 consists of a thin sheet of copper or other suitable metal in which there are formed throughout its length outwardly extending parallel depressions 20 which extend from adjacent one side edge of the plate to adjacent the opposite side edge thereof. The depressions 20 are of uniform size and shape and their inter-center spacing is equal to that of the corrugations 16 in the separators 14. In each of the plates 15, between each pair of the depressions 20, there are formed a number of inwardly extending partispheroidal depressions 21. In each side edge of each of the plates 15, throughout its length, there are formed parallel corrugations 22 which in size and shape are identical with the corrugations 18 in the plates 13, and whose inter-center spacing is, consequently, equal to that of the depressions 20. The corrugations 22 are so disposed that the center of each inwardly extending corrugation is in alignment with the center of one of the depressions 20. The corrugations 22 are of such length and the portions of the side edges of the plates 15 in which they are formed are offset with respect to the intermediate portions thereof to such an extent that the bottoms of the inwardly extending corrugations are in the same plane parallel to the plate as and merge into the outer ends of the depressions 20.

While the two plates 13 of each unit 11 and the two plates 15 of each unit 12 may be formed as separate elements, the two plates of each unit are preferably formed in a single strip 13—13 or 15—15 which is similar in form to the corresponding plates but of somewhat more than twice the length of one of them.

Each of the units 11 is formed by folding one of the strips 13—13 around a separator 14 so that the bottoms of the corrugations in the separator are seated against the bottoms of the inwardly extending corrugations on the adjacent wall of the strip and then overlapping and fastening together the ends of the strip throughout its width. It will be noted that the inwardly extending convexities resulting from the formation of the depressions 19 tend to maintain the corrugations in the separator and the corrugations in the strip in the described relations.

Each of the units 12 is formed by folding one of the strips 15—15 around a separator 14 so that the bottoms of the corrugations in the separator are seated in the depressions 20 and against the bottoms of the inwardly extending corrugations 22 on the adjacent wall of the strip and then overlapping and fastening together the ends of the strip throughout its width. It will be noted that the side walls of the depressions 20 and the inwardly extending convexities resulting from the formation of the depressions 21 tend to maintain the corrugations in the separator and the depressions 20 in the strip in the described relation.

The core 10 is formed by assembling a number of the units 11 and 12, with a unit 11 between each pair of units 12 and a unit 12 between each pair of units 11, so that the corrugations 18 and 22 are inter-nested and that the side edges and ends of the units are in registration; clamping the assembly in a suitable fixture; and then dipping the side edges of the units successively in a flux bath and a solder bath. The soldering operation unites the side edges of the juxtaposed plates 13 and 15 and unites the side edges of the separators to the plates 13 or 15 between which they are interposed and completes the production of a heat exchange element in which there are provided a number of isolated passages 23 of relatively large size alternating with a number of transversely disposed passages 24 of relatively small size. It may here be noted that when the hereinbefore described core is to be used to effect an exchange of heat between lubricating oil of the type employed in the propelling internal combustion engines of automotive vehicles and another fluid, the core is preferably so arranged that the oil flows through the passages 24 and the other fluid through the passages 23 and that, in this event, the walls of the passages 24 should be so constructed and/or arranged that the depth of the passages is one-sixteenth of an inch ($\frac{1}{16}''$) or less because a sufficiently rapid transfer of heat to or from a body of oil of greater thickness than one-sixteenth of an inch ($\frac{1}{16}''$) cannot be efficiently effected.

In the embodiment of the invention illustrated in Figures 1, 2 and 3, the oil passages 24 communicate at their opposite ends with the interiors of side header elements 25. Each of the side header elements consists of a sheet metal plate in which there is formed a channel 26 which is bounded on two side edges and one end edge by flanges 27 and gradually decreases in depth from its unflanged to its flanged end. The side header elements are so disposed that the unflanged end of one is located at the side of the core distant from that of the other and are secured to the core by soldering their side and end flanges to the edges of the core.

The deeper ends of the channels 26 in the header elements 25 communicate with the interior of end header elements 28 on which there are provided a flange 29 which embraces and is soldered to the adjacent end flange 27 of one of the side header elements, a flange 30 which embraces and is soldered to the adjacent unflanged end of the other of the side header elements and flanges 31 which are soldered to the edges of the core.

The structure heretofore described, which, although capable of use as a heat exchanger by itself, may, with respect to the oil temperature regulator as a whole, be considered as a sub-assembly, is in the form of the invention shown in Figures 1, 2 and 3 enclosed within a housing 32 which consists of cup-shaped body and cover members 33 and 34 whose open ends are flanged and secured together by bolts and nuts 35. The housing is secured to the sub-assembly by studs 36 which are anchored in plates 37 which are soldered to the end header elements and extend through the ends of the end header elements, the ends of the body and cover members 33 and 34 and fittings 39 and 38 which are mounted on the ends of the body and cover members.

The plates 37, the end walls of the end header elements, the end walls of the body and cover members and the fittings are apertured, as indicated at 40 and 41, to provide passages through which oil may enter and be discharged from the sub-assembly. To the sides of the body member 33 of the housing, there are secured water inlet and outlet fittings 42 and 43. If desired, there may be fixed to the sub-assembly opposite the water inlet fitting 42 a distributing plate 44.

The oil temperature regulator shown in Figures 1, 2 and 3 of the drawings and hereinbefore described was designed for use on internal combustion engines of the water-cooled type, and is intended to be installed on such engines so that the engine cooling water will enter the fitting 42, pass through the interior of the housing 32 and be discharged from the fitting 43 on its way from the engine water cooling radiator to the engine cooling water jacket and so that the engine lubricant will enter the fitting 38, pass through the interior of the sub-assembly and be discharged from the fitting 39 on its way from the lubricant reservoir to the bearings of the engine.

It will be understood, as indicated by the arrows in Figure 1, that water which enters the fitting 42 will pass therefrom into the interior of the lower part of the housing 32, whence it will pass to the upper part of the housing and, thence, to the fitting 43, in part, by way of the space between the housing and the sub-assembly and, in part, by way of the distributing plate 44 and the passage 23 in the core 10. It will be noted that, since the water which flows through the housing 32 has access to the exterior of the sub-assembly as well as to the interior of the passages 23, all walls of the core are subject both externally and internally to either water pressure or oil pressure which tends to minimize the strains on the core due to the pressure of the fluids passing therethrough.

It will also be understood, as indicated by the arrows in Figure 2, that oil which enters the fitting 38 will pass therefrom successively through the end oil inlet header element 28 and the side oil inlet header element 25 into the passages 24 in the core whence it will pass successively through the side oil outlet header element 25 and the end oil outlet header element 28 into the outlet fitting 39. It will be apparent that the shape of the channels 26 in the side header elements will tend to equalize the flow of oil through the several passages 24 irrespective of their distances from the inlet and outlet ends of the channels.

Because the bottoms of the depressions 20 in the plates 15 are seated against the bottoms of the outwardly extending corrugations 18 in the plates 13 oil passing through the passages 24 can travel from one transverse space defined by a pair of depressions 20 and a pair of outwardly extending depressions 18 to another only by way of the connecting depressions 19, and since the depressions 19 in adjacent rows are staggered with respect to each other, the streams of oil travelling through the passages 24 are continually divided, subdivided, united and reunited with the result that eddy currents, which exert a scrubbing action and tend to prevent congelation of oil on the walls of the passages and to remove congealed oil therefrom and, consequently, promote most efficient heat exchange between the fluids in the passages 23 and 24, are produced. It will be observed that, although the passages defined in part by the depressions 19 are narrower than the passages defined in part by the inwardly extending corrugations 18, the mean depth of the former is somewhat greater than that of the latter and the oil flow capacity of a transverse row of the former is substantially equal to that of one of the latter. This feature tends to equalize the strains on the side walls of the oil passages at different points due to oil pressure and, consequently, to strengthen the oil temperature regulator as a whole.

The oil temperature regulator shown in Figures 4 and 5 includes a core 50 which, except that it contains a smaller number of core units, 11 and 12, is identical with the core previously described. To the edges of the sides of the core 50 through which the oil passages open, there are secured, through the intermediary of relatively heavy side plates 59, oil inlet and outlet headers 51 and 52. The sub-assembly which consists of the core 50, the side plates 59, and the oil headers 51 and 52 is inclosed within a housing 53 which does not, except in size, differ from the housing 32 shown in Figures 1 and 2 and this sub-assembly is connected to the housing 53 in the same manner that the sub-assembly shown in Figures 1 and 2 is connected to the housing 32. The oil temperature regulator shown in Figures 4 and 5 is provided with oil inlet and outlet fittings 55 and 54, respectively, water inlet and outlet fittings 56 and 57, respectively, and a water distributing plate 58 similar to the corresponding parts of the oil temperature regulator shown in Figures 1, 2 and 3.

Figure 6:
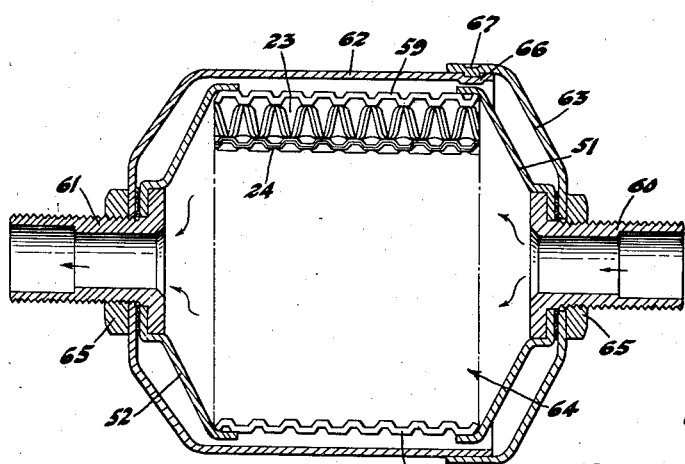
Figure 6 is a longitudinal section through a third oil temperature regulator in which my invention is embodied.

The oil temperature regulator shown in Figure 6 does not differ materially from that shown in Figures 4 and 5 except in that the core 64 contains fewer units 11 and 12, in the construction of the oil inlet and outlet fittings 60 and 61 and in the manner in which the body 62 and cover 63 of the housing are secured together and to the sub-assembly which in the regulator shown in Figure 6 includes the oil inlet and outlet fittings as well as the core, the side plates 59 and the oil inlet and outlet headers 51 and 52. In the oil temperature regulator shown in Figure 6, the oil inlet and outlet fittings consist of tubular elements whose inner ends are flanged and soldered to the interior of the oil inlet and outlet headers, respectively. In the closed ends of the body and cover portions of the housing 62—63, there are provided openings through which the oil outlet and inlet fittings extend. The housing is secured to the sub-assembly by nuts 65 which are threaded on the fittings 60 and 61 and the body and cover portions of the housing whose open ends are telescopically related are secured together by solder. To hold the body and cover portions of the housing together during the soldering operation, nuts may be screwed on the fittings prior to the soldering operation or interfitting snap lock elements 66 and 67 may be formed on the telescopically related edges of the open ends of the body and cover portions of the housing.

It will be apparent that, in operation, the oil temperature regulators shown in Figures 4, 5 and 6 do not differ from that shown in Figures 1, 2 and 3 except in that the oil flows therethrough in a straight line between the oil inlet and outlet fittings. In Figures 4, 5 and 6, the heavy arrows indicate the path of water and the light arrows the path of oil through the oil temperature regulators.

In the oil temperature regulator shown in Figure 7, the sub-assembly 70 does not differ substantially from that shown in Figures 1, 2 and 3 except in the oil inlet and outlet fittings 71 and 72 which are similar to those incorporated in the oil temperature regulator shown in Figure 6. In the oil temperature regulator shown in Figure 7, the housing consists of two similar generally cup-shaped members 73 and 74 which are secured to the sub-assembly 70 by means of nuts 75 and together through flanges 76 which are formed on their open ends by means of nuts and bolts 77. To one side of the cup-shaped member 73 opposite the ends of the water passages in one end of the core 10 there is secured a water inlet fitting 78 and to the corresponding side of the cup-shaped member 74 opposite the water passages in the other end of the core, there is secured a water outlet fitting 79. The side of the housing opposite that to which the fittings 78 and 79 are secured is bulged outwardly, as indicated at 80. It is intended that water which enters the housing through the inlet fitting 78 shall pass therefrom through and around the portion of the sub-assembly 70 on the same side of the flanges 76 as the fitting and then turn at a right angle and travel through the bulge 80 to the opposite end of the housing and thence through and around the opposite end of the sub-assembly to and through the water outlet fitting 79. To cause the water to flow in the indicated path, there is clamped between the flanges 76 a plate 81 which bridges the space between the housing and the core at all points except between the bulge and the adjacent wall of the core. Except as indicated above, the oil temperature regulator shown in Figure 7 does not differ in operation from that shown in Figures 1, 2 and 3. In Figure 7, as in Figures 1, 2, 4, 5 and 6, the heavy arrows indicate the path of water flow and the light arrows the path of oil flow through the oil temperature regulator.

The plate 90 which is shown fragmentarily in Figure 10 is a modification of the plate 13 which is shown in preceding figures and does not differ from the plate 13 except in that the depressions 92 are spaced apart a smaller distance than the corresponding depressions 19 in the plate 13 and in that the end depressions are of slightly different form than the intermediate depressions.

Figure 11:
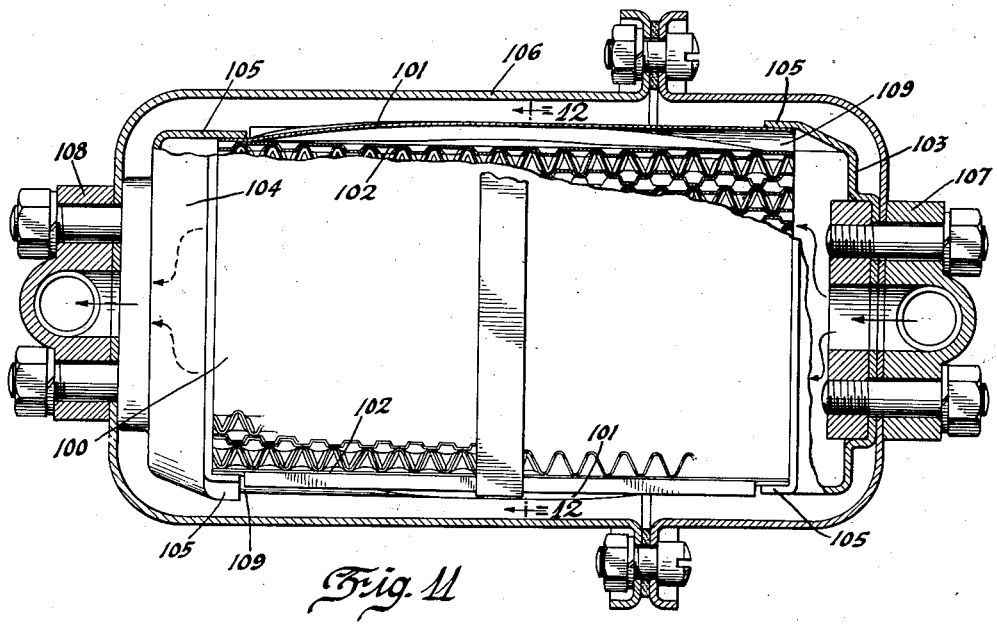
Figure 11 is a longitudinal section through a fifth oil temperature regulator in which my invention is embodied.
Figure 12:
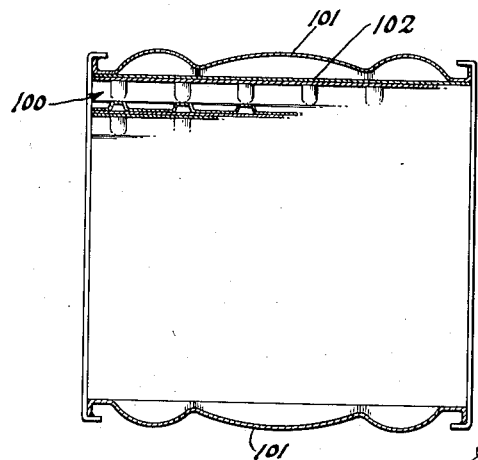
Figure 12 is a section taken on the line 12—12 of Figure 11.
Figure 13:
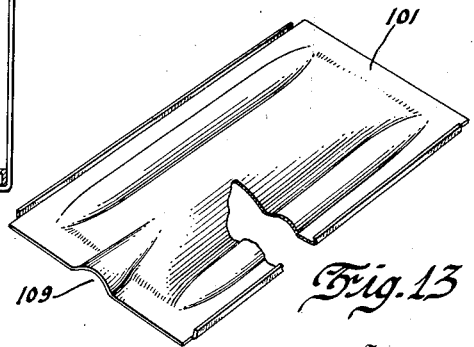
Figure 13 is a perspective view of an element of the core of the oil temperature regulator shown in Figures 11 and 12.

The oil temperature regulator shown in Figures 11, 12 and 13 includes a core 100 which, except that it is of somewhat different shape, does not differ materially from the cores shown in the preceding figures. A side plate 101, which is slightly outwardly convex, is disposed on the outer side of each of the elements 102 (of which either may be either a plate 13 or a plate 15) with its side and end edges soldered or otherwise suitably secured to the corresponding edges of the element 102. To the edges of the ends of the core through which the oil passages open, there are secured oil inlet and outlet headers 103 and 104 on which there are provided flanges 105 which overlap and are secured to the ends of the side plates 101. The space between one of the side plates 101 and the corresponding element 102 is placed in communication with the interior of the oil inlet header 103 by a channel 109 which is formed in part in an end edge of the side plate and in part in the overlapping flange 105 of the oil header and the space between the other of the side plates and the corresponding element 102 is placed in communication with the interior of the oil outlet header 104 by a similarly formed channel. The sub-assembly, which consists of the core 100, the side plate 101, and the oil headers 103 and 104 is inclosed within a housing 106 which does not differ materially from the housing 32 shown in Figures 1 and 2 and is connected to the housing 106 in the same manner that the sub-assembly shown in Figures 1 and 2 is connected to the housing 32. The oil temperature regulator shown in Figures 11 to 13 is provided with oil inlet and outlet fittings 107 and 108, respectively, and water inlet and outlet fittings (not shown) similar to the corresponding parts shown in Figures 1 and 2.

Oil and water flow through the oil temperature regulator shown in Figures 11 to 13 in the same general manner as through the oil temperature regulators shown in Figures 4, 5 and 6. However, it will be noted that the oil temperature regulator shown in Figures 11 to 13 has one important advantage over the oil temperature regulators shown in Figures 4, 5 and 6, viz., that, since during operation of the regulator the spaces between the side plates 101 and the elements 102 will become filled with oil from the oil headers, oil pressure will be applied to the outer sides of the elements 102 which will tend to equalize the oil pressure applied to the interiors of the oil passages through the core and, consequently, to prevent disruption or distortion of the core.

Although I have shown and described preferred embodiments of my invention, it is to be understood that this has been done by way of example and not by way of limitation and that the scope of my invention is to be determined only by the appended claims.

I claim:

1. In a heat exchanger, means defining a fluid channel consisting of relatively wide portions spaced longitudinally of the direction of flow of the fluid joined by a plurality of relatively narrow portions spaced transversely of the direction of flow of the fluid.

2. The invention claimed in claim 1 in which the total cross-sectional area of the relatively narrow portion is such that the flow capacity thereof is substantially equal to that of each of the relatively wide portions which they join.

3. In a heat exchanger, plate-like elements which define a relatively shallow fluid channel, relatively wide, spaced concavities extending transversely of the inner face of one of the elements, a plurality of relatively narrow spaced concavities joining each adjacent pair of the relatively wide concavities, and convexities on the other of the elements so arranged as to prevent communication between the relatively wide concavities except through the relatively narrow concavities.

4. The invention claimed in claim 3 in which the relatively narrow concavities are of greater depth than the relatively wide concavities.

5. In a heat exchanger, plate-like elements which define a channel, through which fluid under pressure is adapted to be circulated, and means whereby the static pressure of the fluid will be applied to the outer sides of the elements to balance the pressure exerted thereon by the fluid flowing through the channel.

6. In a heat exchanger, a member in which there are provided two sets of passages arranged in heat-exchanging relation, a header element which is located on one side of the member and communicates with one end of one set of the passages, a header element which is located on the opposite side of the member and communicates with the other end of the last-mentioned set of passages, the header elements varying in depth from one end to the other and the shallow end of one being located at the end of the member distant from that at which the shallow end of the other element is located, and a header element located on one end of the member and communicating with one of the mentioned header elements.

7. In a heat exchanger, a core through which fluid is adapted to be circulated under pressure, and means to apply the pressure of the fluid to the outer sides of the core to balance the pressure of the fluid flowing therethrough including pockets on the outer sides of the core to which the fluid has access.

8. In a heat exchanger, a member in which there are provided two sets of passages arranged in heat exchanging relation, a header element which communicates with one end of one set of the passages, a header element which communicates with the other end of the last mentioned set of passages, the header elements varying in depth from one end to the other and the shallow end of one being located at the end of the member distant from that at which the shallow end of the other element is located, and a header element communicating with the deep end of each of the mentioned header elements.

9. In a heat exchanger, a core which includes plate-like elements between which fluid under pressure is adapted to flow, and means to apply the pressure of the fluid to the outer sides of the core to balance the pressure of the fluid flowing therethrough including closed spaces on the outer sides of the outer plates to which the fluid has access.

10. In a heat exchanger, a core which includes plate-like elements which define passages through which fluid under pressure is adapted to flow fluid headers, and reinforcing elements which engage the core and extend from one of the headers to the other.

11. In a heat exchanger, a core which includes plate-like elements which define passages through which fluid under pressure is adapted to flow, reinforcing plates seated on and secured to the outer plate-like elements, and fluid headers which are secured to the reinforcing plates.

12. In a heat exchanger, plate-like elements which define a passage through which fluid is adapted to flow, spaced convexities which extend transversely of one and engage the other of the plate-like elements, and concavities which connect the spaces between the mentioned convexities.

13. In a heat exchanger, plate-like elements which define a passage through which fluid is adapted to flow, spaced convexities which extend transversely of one and engage the other of the plate-like elements, and concavities in the mentioned convexities which connect the spaces therebetween.

14. In a heat exchanger, plate-like elements which define a passage through which fluid is adapted to flow, corrugations in the opposite edges of one of the plate-like elements, and corrugations which extend across the other of the plate-like elements and at their ends are internested with the corrugations in the first-mentioned plate-like element.

15. In a heat exchanger, a plate-like element, elongated spaced convexities in the plate-like element, and concavities which connect the spaces between the mentioned convexities and form on the opposite side of the plate-like element convexities between which crests of a sinuous element are adapted to be located.

JOHN RALPH HOLMES.